United States Patent
Maltsev et al.

(10) Patent No.: US 9,531,450 B2
(45) Date of Patent: Dec. 27, 2016

(54) APPARATUS, SYSTEM AND METHOD OF BEAM SELECTION FOR BEAMFORMED DIVERSITY WIRELESS COMMUNICATION

(71) Applicant: INTEL CORPORATION, Santa Clara, CA (US)

(72) Inventors: Alexander Alexandrovich Maltsev, Nizhny Novgorod (RU); Andrey Pudeyev, Nizhny Novgorod (RU); Vadim S. Sergeyev, Nizhny Novgorod (RU); Ali S. Sadri, San Diego, CA (US); Carlos Cordeiro, Portland, OR (US); Alexei Vladimirovich Davydov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/619,293

(22) Filed: Feb. 11, 2015

(65) Prior Publication Data

US 2015/0222333 A1     Aug. 6, 2015

Related U.S. Application Data

(63) Continuation of application No. 13/798,852, filed on Mar. 13, 2013, now Pat. No. 9,001,879.

(60) Provisional application No. 61/723,808, filed on Nov. 8, 2012.

(51) Int. Cl.
| | |
|---|---|
| *H04L 27/00* | (2006.01) |
| *H04B 7/04* | (2006.01) |
| *H04B 7/06* | (2006.01) |

(52) U.S. Cl.
CPC .......... *H04B 7/0408* (2013.01); *H04B 7/0413* (2013.01); *H04B 7/0695* (2013.01); *H04B 7/0626* (2013.01)

(58) Field of Classification Search
CPC ... H04B 7/0408; H04B 7/0413; H04B 7/0695; H04B 7/0626
USPC ....... 375/295, 259, 260, 262, 265, 267, 296, 375/316, 340, 343; 370/203, 204, 205, 370/208, 209, 329, 333, 343
See application file for complete search history.

(56) References Cited

U.S. PATENT DOCUMENTS

| | | |
|---|---|---|
| 7,043,275 B2 | 5/2006 | Matsuoka et al. |
| 7,729,333 B2 | 6/2010 | Wang et al. |
| 7,978,781 B2 | 7/2011 | Zhang et al. |
| 8,644,262 B1 | 2/2014 | Sun et al. |
| 8,644,288 B2 | 2/2014 | Wang et al. |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Dhaval Patel
(74) *Attorney, Agent, or Firm* — Shichrur & Co.

(57) ABSTRACT

Some demonstrative embodiments include devices, systems and/or methods of beam selection for beamformed communication. For example, an apparatus may include a controller to control a plurality of antenna subarrays to form a plurality of directional beams for communicating a beamformed diversity wireless transmission over a plurality of selected directional links, which are selected based on at least one predefined selection metric.

18 Claims, 7 Drawing Sheets

(56) References Cited

U.S. PATENT DOCUMENTS

| | | | |
|---|---|---|---|
| 8,855,228 B2 | 10/2014 | Zhang et al. | |
| 8,855,577 B2* | 10/2014 | Tang | 455/69 |
| 8,873,484 B1* | 10/2014 | Lee et al. | 370/329 |
| 8,995,587 B1 | 3/2015 | Zhang et al. | |
| 9,001,879 B2 | 4/2015 | Maltsev et al. | |
| 9,014,045 B2 | 4/2015 | Ko et al. | |
| 9,036,608 B2 | 5/2015 | Chen et al. | |
| 2010/0234040 A1* | 9/2010 | Palanki | H04L 5/0073 455/452.2 |
| 2011/0018767 A1* | 1/2011 | Maltsev et al. | 342/373 |
| 2012/0275356 A1 | 11/2012 | Aharony et al. | |
| 2013/0121185 A1* | 5/2013 | Li et al. | 370/252 |
| 2013/0322251 A1* | 12/2013 | Kotecha et al. | 370/236 |
| 2014/0206414 A1 | 7/2014 | Oh et al. | |
| 2014/0301238 A1 | 10/2014 | Chun et al. | |
| 2014/0348271 A1 | 11/2014 | Ma et al. | |
| 2015/0126236 A1* | 5/2015 | Mukherjee | H04B 7/0417 455/522 |
| 2015/0195833 A1 | 7/2015 | Ko et al. | |

OTHER PUBLICATIONS

Wireless Gigabit Alliance (WGA) Specifications; WiGig MAC and PHY Specification Version 1.1, Apr. 2011—Final Specification; 442 pages.

U.S. Appl. No. 13/795,073, filed Mar. 12, 2013, 43 pages.

Office Action for U.S. Appl. No. 13/798,852, mailed on Jun. 10, 2014, 15 pages.

Final Office Action for U.S. Appl. No. 13/798,852, mailed on Aug. 25, 2014, 12 pages.

Office Action of U.S. Appl. No. 13/795,073, mailed Aug. 27, 2015, 24 pages.

Office Action for U.S. Appl. No. 13/795,073, mailed on Feb. 12, 2016, 19 pages.

* cited by examiner

| | Field | Size | | Meaning |
|---|---|---|---|---|
| 402 | SNR subfield | $SNR_1$ | 6 bits | SNR as measured in the first TRN-T field or at the first sector from which ScS frame is received. |
| | | $SNR_2$ | 6 bits | SNR as measured in the second TRN-T field or at the second sector from which ScS frame is received. |
| | | ⋮ | | |
| | | $SNR_{N_{beam}}$ | 6 bits | SNR as measured in the $N_{beam}$'th TRN-T field or at the $N_{beam}$'th sector from which ScS frame is received. |
| 404 | Channel Measurement subfield | Channel Measurement 1 | $N_{tap} \times 14$ bits | Channel measurement for the first TRN-T field |
| | | Channel Measurement 2 | $N_{tap} \times 14$ bits | Channel measurement for the second TRN-T field |
| | | ⋮ | | |
| | | Channel Measurement $N_{beam}$ | $N_{tap} \times 14$ bits | Channel measurement for the $N_{beam}$ TRN-T field |
| 406 | Tap Delay subfield | Relative Delay Tap #1 | 7 bits | The delay of Tap #1 in units of Tc relative to the path with the shortest delay detected. |
| | | Relative Delay Tap #2 | 7 bits | The delay of Tap #2 in units of Tc relative to the path with the shortest delay detected. |
| | | ⋮ | | |
| | | Relative Delay Tap #$N_{tap}$ | 7 bits | The delay of Tap #$N_{tap}$ in units of Tc relative to the path with the shortest delay detected. |
| 408 | Sector ID order subfield | Sector $ID_1$ (409) | 8 bits | Sector ID for $SNR_1$ being obtained, or sector ID of the first detected beam. |
| | | Sector $ID_2$ | 8 bits | Sector ID for $SNR_2$ being obtained, or sector ID of the second detected beam. |
| | | ⋮ | | |
| | | Sector $ID_{N_{beam}}$ or Sector $ID_{N_{beam}}$ | 8 bits | Sector ID for $SNR_{N_{beam}}$ being obtained, or sector ID of the Nbeam'th detected beam. |
| | Zero pad | Zeros | Variable (0-7) | Padding to make the Channel Measurement Feedback element length a multiple of 8 bits. |

APPARATUS, SYSTEM AND METHOD OF BEAM SELECTION FOR BEAMFORMED DIVERSITY WIRELESS COMMUNICATION

CROSS REFERENCE

This application is a Continuation application of U.S. patent application Ser. No. 13/798,852, filed on Mar. 13, 2013, which claims the benefit of and priority from U.S. Provisional Patent Application No. 61/723,808 entitled "Apparatus, System and Method of Beam Selection for Multi-Input-Multi-Output (MIMO) Beamformed Communication", filed Nov. 8, 2012, the entire disclosure of which is incorporated herein by reference.

TECHNICAL FIELD

Embodiments described herein generally relate to beam selection for beamformed diversity wireless communication.

BACKGROUND

Some wireless communication systems may communicate over the Millimeter wave (mmWave) frequency band, e.g., the 60 GHz Frequency band. A mmWave propagation has a few major distinctive features in comparison with lower frequency bands, e.g., the frequency bands of 2.4-5 GHz. For example, the mmWave propagation may have a propagation loss greater than the propagation loss in the lower frequency bands, and may have Quasi-optical propagation properties.

A mmWave communication system may use high-gain directional antennas to compensate for large path loss and/or employ beam-steering techniques. Design of appropriate antenna system and/or further signal processing may be an important aspect of mmWave communication system development.

Multi-element phased antenna arrays may be used, for example, for creation of a directional antenna pattern. A phased antenna array may form a directive antenna pattern or a beam, which may be steered by setting appropriate signal phases at the antenna elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 4 is a schematic structure of a channel measurement feedback element, in accordance with some demonstrative embodiments.

DETAILED DESCRIPTION

Figure 1:
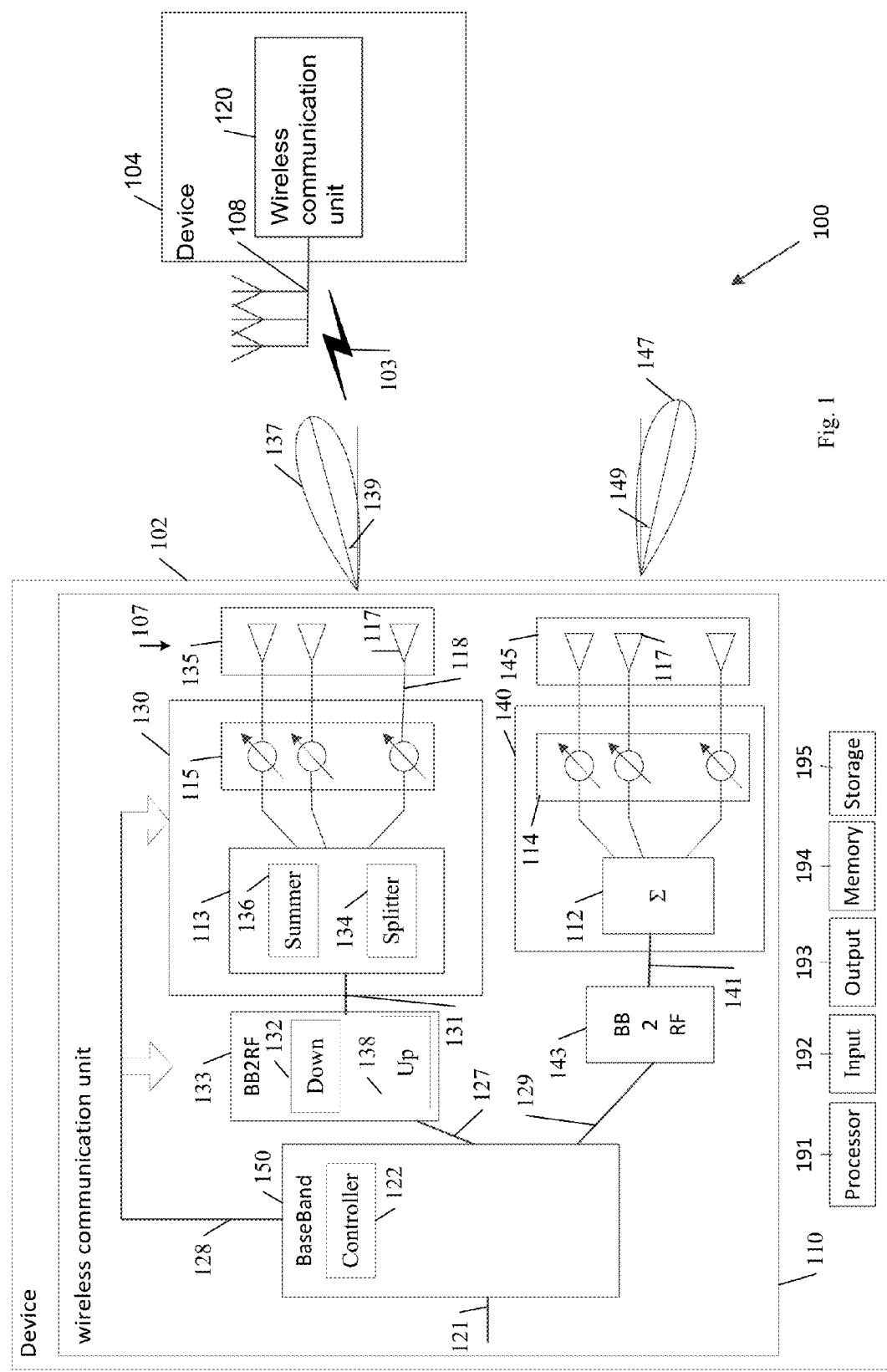
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control (MAC) and Physical Layer (PHY) Specifications,* Mar. 29, 2012; *IEEE802.11 task group ac (TGac)* ("*IEEE802.11-09/0308r12 —TGac Channel Model Addendum Document*"); *IEEE 802.11 task group ad (TGad)* (*IEEE P802.11ad Standard for Information Technology— Telecommunications and Information Exchange Between Systems—Local and Metropolitan Area Networks—Specific Requirements—Part* 11: *Wireless LAN Medium Access Control (MAC) and Physical Layer (PHY) Specifications— Amendment* 3: *Enhancements for Very High Throughput in the* 60 *GHz Band*)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

The phrase "mmWave frequency band" as used herein may relate to a frequency band above 30 GHz, e.g., a frequency band between 30 GHz and 300 GHz. The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The term "beamforming", as used herein, may relate to a spatial filtering mechanism, which may be used at a transmitter and/or a receiver to improve one or more attributes, e.g., the received signal power or signal-to-noise ratio (SNR) at an intended receiver.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102 and/or 104, capable of communicating content, data, information and/or signals over a wireless communication link, for example, over a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include a wireless communication unit capable of communicating content, data, information and/or signals over at least one wireless communication link 103. For example, device 102 may include a wireless communication unit 110 and device 104 may include a wireless communication unit 120.

In some demonstrative embodiments, wireless communication units 110 and/or 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, wireless communication devices 102 and/or 104 may include, for example, a PC, a desktop computer, a mobile computer, a laptop computer, a notebook computer, a tablet computer, an Ultrabook™, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

Devices 102 and/or 104 may also include, for example, one or more of a processor 191, an input unit 192, an output unit 193, a memory unit 194, and a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication link 103 may include a direct link, e.g., a P2P link, for example, to enable direct communication between devices 102 and 104.

In some demonstrative embodiments, wireless communication link 103 may include a wireless communication link over the mmWave band, e.g., the DMG band.

In some demonstrative embodiments, wireless communication devices 102 and/or 104 may perform the functionality of mmWave STAs, e.g., DMG stations ("DMG STA"). For example, wireless communication devices 102 and/or 104 may be configured to communicate over the DMG band.

In some demonstrative embodiments, wireless communication link 103 may include a wireless beamformed link.

In some demonstrative embodiments, wireless communication link 103 may include a wireless gigabit (WiGig) link.

For example, wireless communication link 103 may include a wireless beamformed link over the 60 GHZ frequency band.

In other embodiments, wireless communication link 103 may include any other suitable link and/or may utilize any other suitable wireless communication technology.

In some demonstrative embodiments, antennas 107 may include at least one antenna array including a plurality of antenna elements 117. The plurality of antenna elements 117 may be configured, for example, for creation of a highly-directional antenna pattern. The plurality of antenna elements 117 may include, for example, about 16-36 antenna elements, or any other number of antenna elements, which may be placed in a predefined geometry. The plurality of antenna elements 117 may be configured to form a highly directive antenna pattern or a beam, which may be steered by setting appropriate signal phases at antenna elements 117, e.g., as described below.

In some demonstrative embodiments, antennas 107 may include a plurality of antenna subarrays. For example, antennas 107 may include a first antenna subarray 135, and a second antenna subarray 145. In other embodiments, antennas 107 may include any other number of antenna subarrays, e.g., more than two antenna subarrays.

The phrase "antenna subarray" as used herein may relate to a group of antenna elements of the plurality of antenna elements 117, which may be coupled, for example, to a common RF chain. In one example, antennas 107 may include an antenna array, which may be divided into a plurality of, e.g., independent subarrays, each capable of independently generating a directional beam. In another example, antennas 107 may include a plurality of different antenna arrays to generate a plurality of directional beams. In another example, antennas 107 may include two or more different antenna arrays. One or more of the different antenna arrays may be divided into two or more subarrays.

In some demonstrative embodiments, first antenna subarray 135 may include a first plurality of antenna elements of the plurality of antenna elements 117 configured to form a first directional beam 137 directed in a first direction 139.

In some demonstrative embodiments, second antenna subarray 145 may include a second, e.g., different, plurality of antenna elements of the plurality of antenna elements 117 configured to form a second directional beam 147 directed in a second direction 149.

In some demonstrative embodiments, wireless communication unit 110 may include a plurality of Radio Frequency (RF) chains configured to control the first and second pluralities of antenna elements of antenna subarrays 135 and 145.

In some demonstrative embodiments, the plurality of RF chains may be coupled to the plurality of antenna subarrays. For example, wireless communication unit 110 may include a first RF chain 130 connected to first antenna subarray 135, and a second RF chain 140 connected to second antenna subarray 145. In other embodiments, wireless communication unit 110 may include any other number of RF chains coupled to the any other number of the plurality of antenna subarrays, e.g., more than two RF chains connected to more than two antenna subarrays.

In some demonstrative embodiments, RF chains 130 and/or 140 may include or may be included as part of a radio frequency integrated circuit (RFIC), which may be connected to antenna subarrays 135 and 145 through a plurality of feed lines 118, which may be, for example, micro-strip feed lines.

In some demonstrative embodiments, the plurality of RF chains may enable processing of two or more independent RF signals, e.g., carrying different data. For example, RF chain 130 may process an RF signal 131, and RF chain 140 may process an RF signal 141.

In some demonstrative embodiments, RF chain 130 may include a plurality of phase shifters 115 configured to adjust the phases of the antenna elements of antenna subarray 135. For example, a phase shifter of phase shifters 115 may be configured to adjust a corresponding antenna element of antenna subarray 135.

For example, phases of the antenna elements of antenna subarrays 135 may be shifted, e.g., by phase shifters 115, to provide a constructive and/or destructive interference, configured to change the beamforming scheme of antenna subarray 135 and to change the direction of directional beam 137.

In some demonstrative embodiments, RF chain 140 may include a plurality of phase shifters 114 configured to adjust the phases of the antenna elements of antenna subarray 145. For example, a phase shifter of phase shifters 114 may be configured to adjust a corresponding antenna element of antenna subarray 145.

For example, phases of the antenna elements of antenna subarrays 145 may be shifted, e.g., by phase shifters 114, to provide a constructive and/or destructive interference, configured to change the beamforming scheme of antenna subarray 145 and to change the direction of directional beam 147.

Phase shifters 115 and/or 114 may be discrete, e.g., configured to rotate the phase of the antenna elements of antenna subarrays 135 and/or 145 to a limited set of values, for example, 0, $\pm\pi/2$, and $\pi$, allowing only a relatively coarse beamforming for changing a direction of directional beams 137 and/or 147.

In some demonstrative embodiments, RF chain 130 may include a summer/splitter block 113 coupled to phase shifters 115 and/or RF chain 140 may include a summer/splitter block 112 coupled to phase shifters 114.

In some demonstrative embodiments, summer/splitter block 113 may include a splitter 134, e.g., a multiplexer, configured to reproduce and split RF signal 131 between the antenna elements of antenna subarray 135 and to couple the reproduced signals of RF signal 131 to phase shifters 115, e.g., when transmitting RF signal 131.

In some demonstrative embodiments, summer/splitter block 113 may include a summer 136 configured to sum into RF signal 131 signals received from the antenna elements of antenna subarray 135, e.g., when receiving RF signal 131.

In some demonstrative embodiments, utilizing two or more RF chains may enable baseband processing of two or more independent signals, e.g., carrying different data, communicated via two or more directional beams. In contrast, utilizing a single RF chain may enable baseband processing of only one signal, e.g., even if a large number of antenna elements 117 are utilized.

For example, RF chains 130 and 140 may enable baseband processing, e.g., independent baseband processing, of RF signals 131 and 141 communicated via directional beams 137 and 147.

In some demonstrative embodiments, wireless communication unit 110 may utilize the two or more RF chains to perform beamformed diversity communication, e.g., as described below.

In some demonstrative embodiments, wireless communication unit 110 may include a baseband 150 configured to control antenna subarrays 135 and 145 to form directional beams 137 and 147 directed to directions 139 and 149 for communicating a MIMO wireless transmission.

In some demonstrative embodiments, baseband 150 may process a data stream 121 into the MIMO wireless transmission to be communicated utilizing a MIMO beamformed scheme, e.g., as described below.

Some demonstrative embodiments are described herein with reference to a wireless communication unit, e.g., wireless communication unit 110, configured to perform both transmission and reception of a MIMO beamformed communication. Other embodiments may include a wireless communication unit capable of performing only one of transmission and reception of a MIMO beamformed communication.

The phrase "beamformed diversity communication", as used herein may relate to any communication utilizing a plurality of beams.

Some demonstrative embodiments are described herein with reference to a communication system, e.g., wireless communication system 100, wherein both the TX side and the RX side utilize a plurality of antenna subarrays to communicate a MIMO transmission. However, other embodiments may be implemented with respect to systems configured to communicate any other diversity communication, for example, systems in which only one of the Tx and Rx sides utilizes a plurality of antenna subarrays, e.g., to form a Single-Input-Multi-Output (SIMO) and/or a Multi-Input-Single-Output (MISO) beamformed link. For example, one of the Tx and Rx sides may utilize an omni-directional antenna, and another one of the Tx and Rx sides may utilize a multi-array transceiver, e.g., wireless communication unit 110.

In some demonstrative embodiments, wireless communication unit 110 may include a plurality of baseband (BB) to RF (BB2RF) converters interfacing between the plurality of RF chains and baseband 150. For example, wireless communication unit 110 may include BB2RF converters 133 interfacing between RF chain 130 and baseband 150, and BB2RF converters 143 interfacing between RF chain 140 and baseband 150. In other embodiments, wireless communication unit 110 may include any other number of BB2RF convertors connecting between baseband 150 and any other number of RF chains, e.g., more than two.

In some demonstrative embodiments, BB2RF converter 133 may convert RF signal 131 into baseband data signal 127 and vice versa, and/or BB2RF converters 143 may convert RF signal 141 into baseband data signal 129 and vice versa.

In one example, BB2RF converter 133 may convert RF signal 131 into baseband data signal 127, and/or BB2RF converter 143 may convert RF signal 141 into baseband data signal 129, e.g., if wireless communication unit 110 receives the MIMO wireless transmission.

In another example, BB2RF converter 133 may convert baseband data signal 127 into RF signal 131 and/or BB2RF converter 143 may convert baseband data signal 129 into RF signal 141, e.g., if wireless communication unit 110 transmits the MIMO wireless transmission.

In some demonstrative embodiments, BB2RF converters 133 and/or 143 may include down-converters, configured to convert an RF signal into a baseband data signal, and to provide the baseband data signal to baseband 150, e.g., if wireless communication unit 110 receives the MIMO wireless transmission.

For example, RF chain 130 may include a down converter 132 configured to down-convert RF signal 131 into data signal 127, and to provide data signal 127 to baseband 150.

In some demonstrative embodiments, baseband to RF converters 133 and/or 143 may include up-converters, configured to convert a baseband data signal into an RF signal and to provide the RF signal to an RF chain, e.g., if wireless communication unit 110 transmits the MIMO wireless transmission.

For example, RF chain 130 may include an up-converter 138 configured to up-convert data signal 127 into RF signal 131 and to provide RF signal 131 to RF chain 130.

In some demonstrative embodiments, wireless communication unit 110 may be configured to perform hybrid beamforming. The hybrid beamforming may include, for example, performing a coarse beamforming in RF chains 130 and/or 140, e.g., using phase-shifters 139 and/or 149; and fine beamforming in baseband 150, e.g., as described below.

In one example, the coarse beamforming may be performed between devices 102 and 104. For example, during the coarse beamforming, device 102 may steer directional beams 137 and/or 147 to a plurality of directions, e.g., which may deliver a maximal RX signal power and/or according to any other criteria; and device 104 may have a fixed quasi-omni antenna pattern of antennas 108 to receive the transmissions from device 102. Alternatively, device 104 may adjust antennas 108 to maximize the received RX signal power, e.g., by performing a sector level sweep.

In some demonstrative embodiments, the fine beamforming may include diversity processing, e.g., MIMO processing, MISO processing and/or SIMO processing, at baseband 150. For example, the MIMO processing may include, for example, closed-loop (CL) MIMO processing, Open Loop (OL) MIMO processing, Space-Block Code (SBC) MIMO processing, e.g., Space Time Block Code (STBC) MIMO processing, Space Frequency Block Code (SFBC) MIMO processing, and the like.

In some demonstrative embodiments, wireless communication unit may include a controller 122 configured to control RF Chains 135 and 145 and baseband 150 to perform the coarse beamforming and/or the fine beamforming.

In some demonstrative embodiments, controller 122 may control antenna subarrays 135 and/or 145 utilizing a control signal 128 carrying the amount of phase shift to be applied to one or more phase shifters of phase shifters 115 and/or 114.

In some demonstrative embodiments, the phase shift adjustments to phase shifters 115 may determine and/or control the beam width, gain and/or direction of directional beam 137 formed by antenna subarray 135.

In some demonstrative embodiments, the phase shift adjustments to phase shifters 114 may determine and/or control the beam width, gain and/or direction of directional beam 147 forms by antenna subarray 145.

In some demonstrative embodiments, each phase shifter of an antenna element of antenna subarrays 135 and/or 145 may perform a local phase adjustment to a signal to create a local phase distribution in a desired beam direction.

In some demonstrative embodiments, control signal 128 may include weighting coefficients, which may be generated and/or derived from controller 122, configured to steer directional beams 137 and/or 147.

In some demonstrative embodiments, controller 122 may provide via control signal 128 a first set of weighting coefficients to phase shifters 115 configured to form a local phase adjustment to one or more antenna elements of antenna subarray 135, resulting in directing beam 137 to direction 139.

In some demonstrative embodiments, controller 122 may provide via control signal 128 a second, e.g., different set of weighting coefficients, to phase shifters 114 configured to form a local phase adjustment to one or more antenna elements of antenna subarray 145, resulting in directing beam 147 to direction 149.

In some demonstrative embodiments, wireless communication unit 110 may be utilized by a Transmit (TX) side and a Receive (RX) side to form a plurality of independent directional communication beams between the TX and RX sides. Accordingly, the plurality of directional beams may be utilized for using a plurality of independent paths for communicating a plurality of data streams, e.g., different data streams, thus increasing total throughput.

In some demonstrative embodiments, a plurality of different signals may be communicated via a plurality of beamformed links formed by the plurality of beamformed beams. Each beamformed link, which corresponds to an antenna subarray of the plurality of antenna subarrays, may communicate a signal, for example, via a plurality of antenna elements of the antenna subarray.

For example, a first signal, e.g., signal 127, may be communicated via a first beamformed link formed by directional beam 137 generated by antenna subarray 135, and a second, e.g., different signal, for example, signal 129, may be communicated via a second beamformed link formed by directional beam 147 generated by antenna subarray 145.

In some demonstrative embodiments, wireless communication unit 110 may communicate the MIMO wireless transmission via a plurality of selected independent directional, e.g., spatial, links between device 102 and 104.

For example, wireless communication unit 110 may select the first beamformed link to communicate the MIMO wireless transmission via directional beam 137 and the second beamformed link to communicate the MIMO wireless transmission via directional beam 147.

In some demonstrative embodiments, the plurality of selected directional links may be selected from a plurality of directional links between devices 102 and 104.

In some demonstrative embodiments, a directional link between devices 102 and 104 may be formed by a pair of a TX sector and an RX sector.

For example, device 102 may perform the functionality of the TX side and device 104 may perform the functionality of the RX side. A first TX sector of device 102 may form a first directional link with a first RX sector of device 104, a second TX sector of device 102 may form a second directional link with a second sector RX of device 104, a third TX sector of device 102 may form a third directional link with a third RX sector of device 104, and/or another TX sector of device 102 may form another directional link with another RX sector of device 104.

In some demonstrative embodiments, controller 122 may determine the plurality of directional links during an establishment of wireless communication link 103, for example, during a TX and/or RX sector scan between devices 102 and 104.

For example, during the TX and RX sector scan, device 102 may detect the plurality of directional links, for example, according to a beamforming training procedure.

Figure 2:
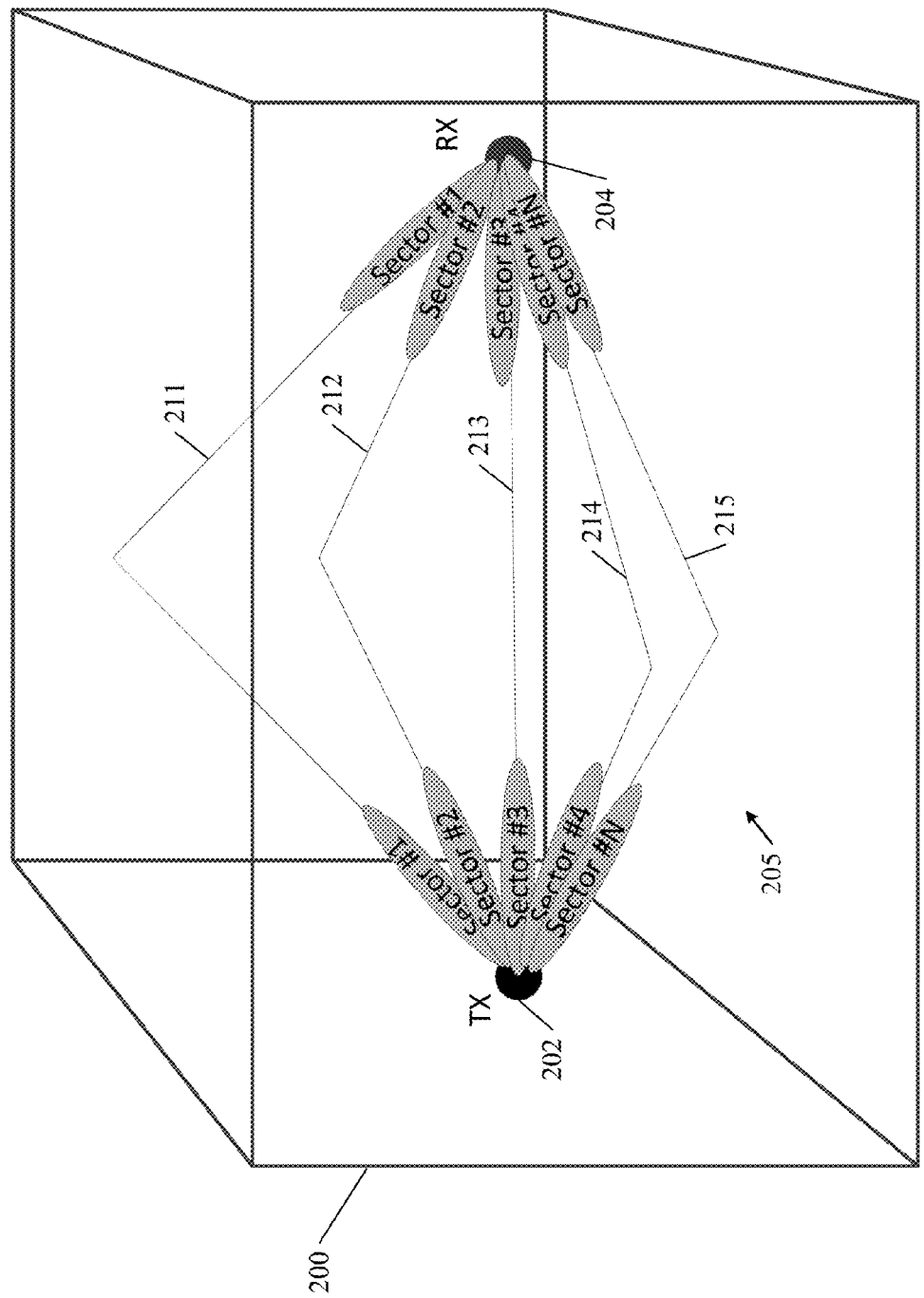
FIG. 2 is a schematic illustration of a plurality of directional links, in accordance with some demonstrative embodiments.

Reference is now made to FIG. 2, which schematically illustrates a plurality of directional links 205 between a TX side 202 and an RX side 204 in an environment 200, in accordance with some demonstrative embodiments. For example, device 102 (FIG. 1) may perform the functionality of TX side 202, and/or device 104 (FIG. 1) may perform the functionality of RX side 204.

For example, environment 200 may include a room, RX side 204 may include a receiver, e.g., a Television (TV) receiver, positioned on a wall of the room, and/or TX side 202 may include a transmitter, e.g., a video player.

As Shown in FIG. 2, the plurality of directional links 205 may include N links, e.g., including links 211, 212, 213, 214 and 215, between TX side 202 and RX side 204. For example, a sector, denoted sector #1, of TX side 202 may form directional link 211 with a sector, denoted sector #1, of RX side 204; a sector, denoted sector #2, of TX side 202 may form directional link 212 with a sector, denoted sector #2, of RX side 204; a sector, denoted sector #3, of TX side 202 may form directional link 213 with a sector, denoted sector #3, of RX side 204; a sector, denoted sector #4, of TX side 202 may form directional link 215 with a sector, denoted sector #4, of RX side 204; and/or a sector, denoted sector #N, of TX side 202 may form directional link 215 with a sector, denoted sector #N, of RX side 204.

In some demonstrative embodiments, directional links 205 may be determined during a sector scan performed between TX side 202 and RX side 204, e.g., according to the WGA Specifications or any other Specification.

Referring back to FIG. 1, in some demonstrative embodiments, diversity processing techniques, e.g., the MIMO processing techniques, may require reliable algorithms for selection and/or tracking of two or more directional links.

In some demonstrative embodiments, controller 122 may be configured to select the plurality of directional links for performing the beamformed diversity communication.

In one example, controller 122 may select directional links 212 and 213 (FIG. 2) for performing the MIMO communication. In another example, controller 122 may select any other directional links of the N directional links 205 (FIG. 2) for performing the MIMO communication.

In some demonstrative embodiments, controller 122 may perform a MIMO final beam combining procedure configured to select two or more directional links, for example, to be formed by two or more pairs of sectors, e.g., an RX sector and a TX sector. For example, wireless communication unit 110 may select more than one pair of TX and RX sectors.

In some demonstrative embodiments, controller 122 may select the selected directional links from a plurality of available links, e.g., the N directional links 205 (FIG. 2), based on at least one predefined selected criterion.

In some demonstrative embodiments, the selection criterion may be configured to relate to one or more predefined properties of wireless communication link 103, e.g., as described below.

In some demonstrative embodiments, controller 122 may select the plurality of directional links, which may provide significant signal power at the RX side.

In some demonstrative embodiments, controller 122 may select the plurality of directional links, which may be mutually uncorrelated, for example, such that each directional link may be required to come from a different direction, be reflected from different objects, have a different angle of arrival and/or departure, and the like. For example, controller 122 may select directional links, e.g., directional links 211 and 215 (FIG. 2), which are coming from different directions, for example, directional link 211 (FIG. 2) is reflected from a ceiling of environment 200 (FIG. 2) and directional link 215 is reflected from a floor of environment 200 (FIG. 2).

In some demonstrative embodiments, the number of the selected directional links may be equal to or greater than the smallest of the number of TX and RX RF chains of the TX and RX sides, and equal to or lesser than the greatest of the number of TX and RX RF chains of the TX and RX sides.

In one example, the number of the selected directional links may be equal to or greater than one and equal to or lesser than two, e.g., if device 102 includes two RF chains, e.g., RF chains 130 and 140, and device 104 includes a single RF chain. Accordingly, the beamformed diversity communication may include a MISO or SIMO communication.

In another example, the number of the selected directional links may be equal to or greater than two and equal to or lesser than four, e.g., if device 102 includes two RF chains, e.g., RF chains 130 and 140, and device 104 includes four RF chains. Accordingly, the beamformed diversity communication may include a MIMO communication.

In some demonstrative embodiments, controller 122 may select the selected directional links based on at least one predefined selection metric.

In some demonstrative embodiments, controller 122 may control the plurality of antenna subarrays to form the plurality of directional beams for communicating the MIMO wireless transmission over the plurality of selected directional links.

In some demonstrative embodiments, controller 122 may control antenna subarrays 135 and/or 145 based on the directions of the selected plurality of directional links.

In one example, controller 122 may select directional beams 213 and 215 (FIG. 2) of the N directional beams 205 (FIG. 2) based on the predefined selection metric. Controller 122 may control antenna subarray 135 to form directional beam 137 directed in direction 139, which is directed to a direction of directional link 213 (FIG. 2), and antenna subarray 145 to form directional beam 147 directed in direction 149, which is directed to a direction of directional link 214 (FIG. 2), for communicating the MIMO wireless transmission over directional links 213 and 214 (FIG. 2).

For example, controller 122 may control antenna subarray 135 to steer directional beam 137 to a direction of directional link 213 (FIG. 2), e.g., if directional link 213 (FIG. 2) is selected for communicating the MIMO wireless transmission, and controller 122 may control antenna subarray 145 to steer directional beam 147 to a direction of directional link 214 (FIG. 2), e.g., if directional link 214 (FIG. 2) is selected for communicating the MIMO wireless transmission.

In some demonstrative embodiments, the selection metric may include a channel capacity metric, e.g., as described below.

In some demonstrative embodiments, controller 122 may determine the selection metric with respect to a particular directional link based on a channel matrix corresponding to the particular link and a number of transmit antenna arrays, e.g., as described below.

In one embodiment, a MIMO channel capacity metric may be defined, for example, to increase, e.g., maximize, system throughput.

In one example, the channel capacity metric may be determined with respect to a directional link, e.g., as follows:

$$C = \log_2 \det\left[I + \frac{1}{\sigma^2 N_t} H H^H\right] \quad (1)$$

wherein C denotes the channel capacity metric corresponding to the directional link, $\sigma^2$ denotes an additive noise power, H denotes a channel matrix corresponding to the directional link, I denotes the identity matrix, and $N_t$ denotes the number of transmit antenna subarrays.

For example, the dimensions of the matrix H may be based on the number of RF chains in the TX side and RX side.

In some demonstrative embodiments, elements of the channel matrix H may be obtained, for example, by channel measurements for combinations, e.g., every combination, of TX side and RX side sector pairs. The channel capacity metric C may be determined, e.g., according to Equation 1, with respect to each sector pair. Two or more pairs, e.g., the pairs, which maximize the channel capacity metric C, may be selected for multi-beam MIMO communication.

For example, controller 122 may determine the channel capacity metric C for each of the N directional links 205 (FIG. 2), e.g., based on Equation 1. For example, the matrix H may include a channel matrix of a directional link of N directional links 205 (FIG. 2), and the number $N_t$ may be equal to two, e.g., if two transmit antenna subarrays, e.g., antenna subarrays 135 and 145, are used.

In some demonstrative embodiments, controller 122 may determine the selection metric with respect to a particular directional link based on a combination of a plurality of Signal-to-Interference-plus-noise-ratio (SINR) values corresponding to a plurality of received diversity streams, for example, MIMO streams, of the particular directional link, e.g., as described below.

In one example, a specific MIMO receiver scheme may be assumed for selection of the optimal combination of directional links. For example, in case of a minimum mean square error (MMSE) receiver scheme, the SINR for a k-th directional link may be calculated, e.g., as follows:

$$SINR_k = \frac{1}{\left\{\left(\frac{H^H H}{\sigma^2} + I\right)^{-1}\right\}_{k,k}} - 1 \quad (2)$$

The SINR per the directional link my be utilized, for example, to compute the selection metric per a total system throughput, e.g., as follows:

$$C = \sum_k \log_2(1 + SINR_k) \quad (3)$$

For example, the SINR for each one of the N directional links 205 (FIG. 2) may be calculated. Controller 122 may select two directional links, e.g., directional links 211 and 213 (FIG. 2), providing the maximal selection metric C according to Equation 3.

In some demonstrative embodiments, controller 122 may determine an SINR value of the SINR values based on an effective channel after performing Space-Block-Code processing, e.g., as described below.

In some demonstrative embodiments, the matrix H defining the channel between the TX and RX sector pair may also account for additional space-time processing, e.g., the MIMO scheme, which may be performed at the transmitter and/or receiver, e.g., in baseband 150. In one example, baseband 150 may perform space-time block coding processing of the MIMO wireless transmission.

In one example, the channel matrix H may be considered as an effective channel after performing the space-time block coding in baseband 150. For example, if utilizing an Alamouti coding scheme, the SINR for the throughput calculation described above may be obtained, e.g., as follows:

$$SINR = \frac{\mathrm{trace}(H^H H)}{\sigma^2} \quad (4)$$

In some demonstrative embodiments, the selection metric may be defined, for example, to improve system robustness.

In some demonstrative embodiments, the selection metric may be based on differences in angles of arrival and/or differences in angles of departure, e.g., as described below.

In one example, sectors with maximal differences in angles of arrival, e.g., at the RX side, and/or angles of departure, e.g., at the TX side, may be selected for communication, e.g., to overcome possible ray blockage, e.g., human blockage.

For example, controller 122 may select directional beams 211 and 215 (FIG. 2) for communicating the MIMO wireless communication, e.g., since a difference in angles of departure and angles of arrival between directional beams 211 and 215 (FIG. 2) is maximal with respect to other combination of directional links of the N directional links 205 (FIG. 2).

In some demonstrative embodiments, controller 122 may utilize any other intelligent algorithms to support a robust mode, such as discovery and usage of directional links reflected from the room ceiling, e.g., directional link 211 (FIG. 2).

In other embodiments, any other suitable selection metric may be defined. For example, instead of a logarithm function, a mutual information function for the specific modulation scheme, e.g., that meets target packet error rate requirements, may be utilized in the selection of the optimal combination of directional links.

In some demonstrative embodiments, wireless communication unit 110 may use one or more feedback mechanisms to communicate information ("beam selection information") between the TX and RX sides, e.g., to support the beam selection procedures described herein. For example, wireless communication unit 110 may communicate with device 104 the beam selection information to support the selection of the directional links.

In some demonstrative embodiments, the beam selection information may be communicated as part of a channel measurement feedback element. In one example, the beam selection information may be communicated as part of one or more dedicated fields of a channel measurement feedback element, e.g., as described below.

In some demonstrative embodiments, the channel measurement feedback element may be transmitted by a STA, e.g., the Tx side or the Rx side. The channel measurement feedback element may be transmitted by the STA, e.g., in response to a beam refinement packet containing a channel measurement request.

In some demonstrative embodiments, the channel measurement feedback element may include a plurality of measurements corresponding to a plurality of sector identifiers.

For example, the channel measurement feedback may include a first sector identifier identifying a first sector of an antenna subarray, and a plurality of measurements corresponding to the first sector.

In some demonstrative embodiments, the channel measurement feedback element may include the channel measurement feedback data measured with respect to the channel measurement request. For example, the channel measurement feedback element may represent measurement feedback data, which may be measured on TRN-T fields of a Beam Refinement packet that includes the channel measurement request.

In some demonstrative embodiments, the channel measurement feedback element may provide, for example, a list of sectors identified by wireless communication unit 110 during a sector scan. The format and size of the channel measurement feedback element may be defined by parameter values specified in an accompanying beam refinement element.

In some demonstrative embodiments, an information element of the channel measurement feedback element may be used to provide the SINR and/or channel taps, e.g., channel impulse response, for a set of selected sectors.

In some demonstrative embodiments, the channel measurement feedback element may be configured to provide information about the particular antenna subarrays, in which measurements are performed.

In some demonstrative embodiments, a new field may be added to information elements, which may be communicated during the measurements, specifying the particular antenna subarray for which measurements are performed, e.g., as described below.

For example, a beam refinement element, e.g., DMG Beam Refinement element, may include a field, e.g., an "array index" field, to include an identifier of the particular antenna subarray for which information about the antenna subarray is provided, for example, if the device has more than one antenna subarray, e.g., as described below with reference to FIG. 3.

Figure 3:
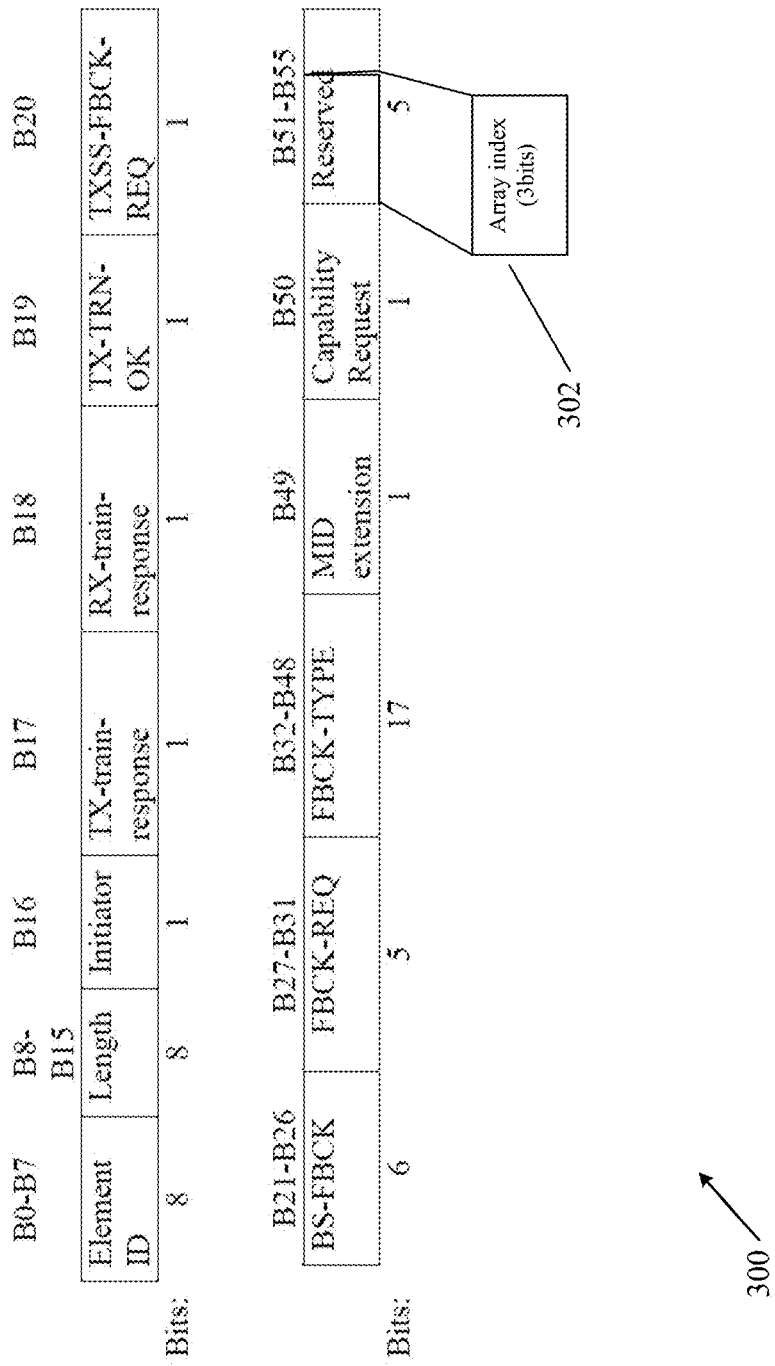
FIG. 3 is a schematic illustration of a structure of a beam refinement element, in accordance with some demonstrative embodiments.

Reference is made to FIG. 3, which schematically illustrates a beam refinement element 300, in accordance with some demonstrative embodiments.

In some demonstrative embodiments, wireless communication unit 110 (FIG. 1) may communicate beam refinement element 300 to device 104 (FIG. 1).

As shown in FIG. 3, beam refinement element 300 may include a reserved field 302, e.g., including five bits or any other number of bits. Reserved field 302 may include an identifier of an antenna subarray for which information about the antenna subarray is provided in beam refinement element 300.

As shown in FIG. 3, the identifier may be of a size of three bits, e.g., capable of representing up to eight antenna subarrays in binary notation. For example, antenna subarray 135 (FIG. 1) may be represented by the binary notation "001", and antenna subarray 145 (FIG. 1) may be represented by the binary notation "010", or any other notation.

Referring back to FIG. 1, in some demonstrative embodiments, wireless communication unit 110 may communicate a channel measurement feedback element including an identifier of a particular antenna subarray, and one or more measurements corresponding to the particular antenna subarray.

For example, wireless communication unit 110 may communicate the channel measurement feedback element, e.g., beam refinement element 300 (FIG. 3), in response to a channel measurement request transmitted from device 104. The channel measurement feedback element may include an identifier, e.g., in field 302 (FIG. 3), of an antenna subarray, e.g., antenna subarray 135 and/or 145, and one or more measurements corresponding to the antenna subarray identified by field 302 (FIG. 3).

In another demonstrative embodiment, the enumeration and meaning of a "sector" may be extended, e.g., redefined, such that the sector number simultaneously identifies the sector index and antenna subarray index. For example, sectors 1:64 may be defined to correspond to antenna subarray 135 (FIG. 1), sectors 65-128 may be defined to correspond to antenna subarray 145 (FIG. 1), and the like.

In some demonstrative embodiments, the extended definition of the sector may require an increased number of bits for identifying a sector, e.g., eight bits to enable identifying sectors of up to eight subarrays. For example, a Channel Measurement Feedback element may include an ID beam field of a size of up to eight bits.

Reference is now made to FIG. 4, which schematically illustrates a channel measurement feedback element 400, in accordance with some demonstrative embodiments.

In some demonstrative embodiments, wireless communication unit 110 (FIG. 1) may communicate channel measurement feedback element 400, e.g., in response to a channel measurement request transmitted from device 104 (FIG. 1).

As shown in FIG. 4, channel measurement feedback element 400 may include subfields, e.g., subfields 402, 404, 406 and/or 408, including information elements of the channel measurement feedback element 400.

As shown in FIG. 4, subfield 402 may provide the SINR measured on the TRN-T fields, subfield 404 may provide the channel measurement, measured on the TRN-T fields, subfield 406 may provide the TAP delay of the sectors, and subfield 408 may include identifier of a sector ID to which the information of subfields 402, 404 and 406 relates.

In some demonstrative embodiments, subfield 408 may be defined, such that the sector number simultaneously identifies the sector index and antenna array index, e.g., as described above with reference to the ID beam field. Accordingly, a size 409 of a sector ID field may be increased from six bits to eight bits.

Referring back to FIG. 1, in some demonstrative embodiments, wireless communication unit 110 may communicate the channel measurement feedback element, in response to a channel measurement request transmitted from device 104. The channel measurement feedback element may include a plurality of sector identifiers, each sector identifier identifying a particular antenna subarray and a particular sector corresponding to the particular antenna subarray. Fields 402, 404 and/or 406 (FIG. 4) may include measurements performed with respect to the sectors of subarray 135 and 145 identified in subfield 408 (FIG. 4).

For example, wireless communication unit 110 may communicate the channel measurement feedback element including a first plurality of sector identifiers, for example, a first portion of subfield 408 (FIG. 4), identifying one or more sectors of antenna subarray 135, e.g., a first sector identifier identifying a first sector of antenna subarray 135, a second sector identifier identifying a second sector of antenna subarray 135 and one or more sector identifiers identifying one or more additional sectors of antenna subarray 135; and a second plurality of sector identifiers, for example, a second portion of subfield 408 (FIG. 4), indentifying one or more sectors of antenna subarray 145, e.g., a first sector identifier identifying a first sector of antenna subarray 145, a second sector identifier identifying a second sector of antenna subarray 145 and one or more sector identifiers identifying one or more additional sectors of antenna subarray 145. Fields 402, 404 and/or 406 (FIG. 4) may include measurements performed with respect to the sectors of subarray 135 and 145 identified in subfield 408 (FIG. 4).

In some demonstrative embodiments, flexible division of a large multi-element antenna array into several subarrays may be performed. To support such flexible subarray configurations, the information about the used configuration and about the number of antenna elements in each subarray may also be included in the feedback, e.g. in a separate information element.

Figure 5:
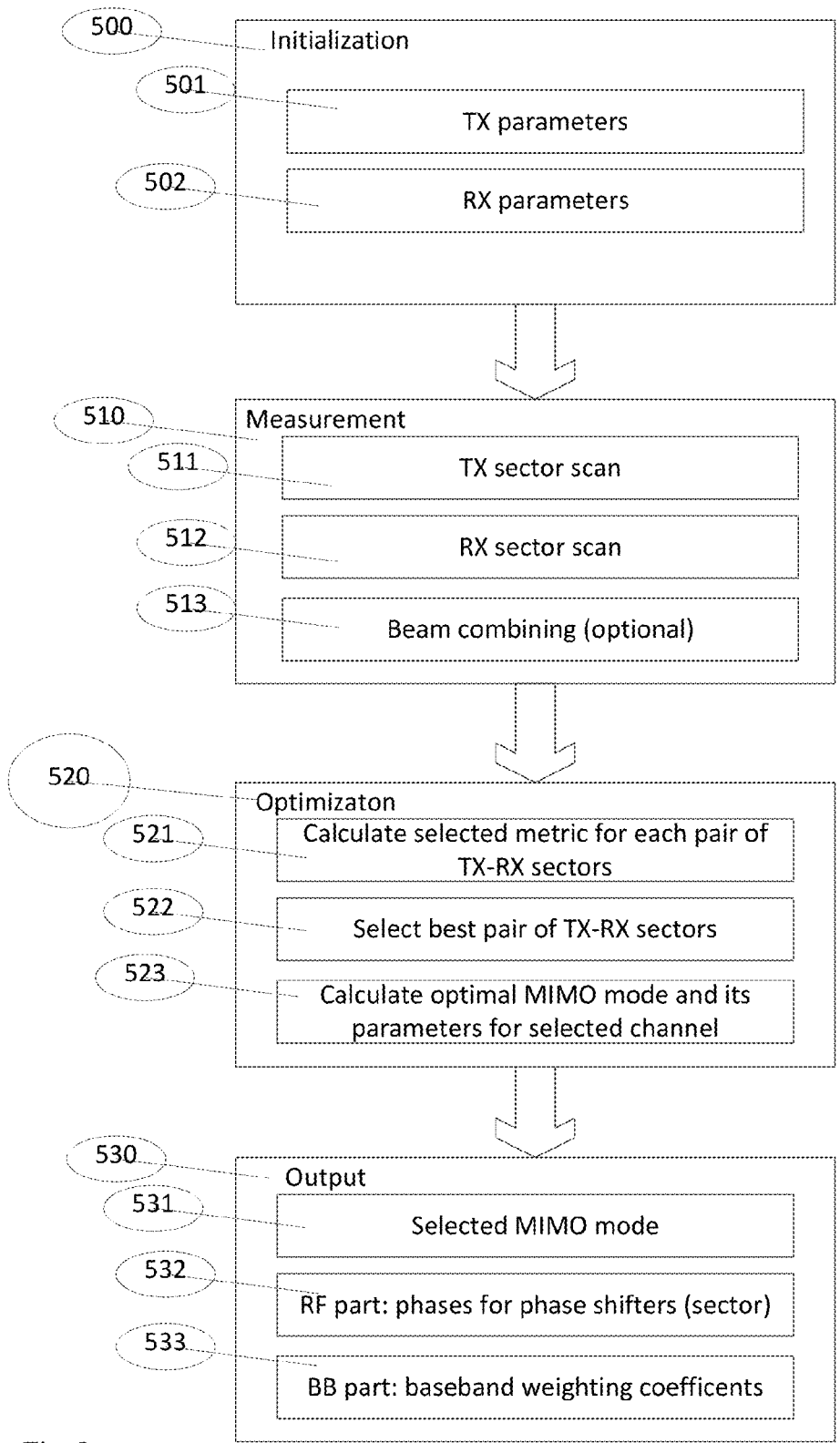
FIG. 5 is a schematic flow-chart illustration of a method of beam selection for multi-beam beamformed communication, in accordance with some demonstrative embodiments.

Reference is made to FIG. 5, which schematically illustrates a method of beam selection for MIMO beamformed communication, in accordance with some demonstrative embodiments. In some embodiments, one or more of the operations of the method of FIG. 5 may be performed by a wireless communication system, e.g., system 100 (FIG. 1); a wireless communication device, e.g., device 102 (FIG. 1); a baseband, e.g., baseband 150 (FIG. 1); a controller, e.g., controller 122 (FIG. 1), and/or a wireless communication unit, e.g., wireless communication units 110 and or 120 (FIG. 1).

As indicated at block 500, the method may include initializing TX and RX parameters. For example, wireless communication unit 110 (FIG. 1) may initialize TX and RX parameters of devices 102 and/or 104 (FIG. 1).

As indicated at block 501, initializing the TX and RX parameters may include initializing TX parameters. For example, wireless communication unit 110 (FIG. 1) may obtain a number of antenna subarrays of device 102 (FIG. 1) and a set of sectors of device 102 (FIG. 1) to perform sector scanning, e.g., as described above.

As indicated at block 502, initializing the TX and RX parameters may include initializing RX parameters. For example, wireless communication unit 110 (FIG. 1) may obtain a number of antenna subarrays of device 104 (FIG. 1) and a set of sectors of device 104 (FIG. 1) to perform sector scanning, e.g., as described above.

As indicated at block 510, the method may include measuring beamforming parameters. For example, wireless communication unit 110 (FIG. 1) may measure beamforming parameters of a plurality of directional links between devices 102 (FIG. 1) and 104 (FIG. 1), e.g., as described above.

As indicated at block 511, measuring the beamforming parameters may include performing a TX sector scan. For example, wireless communication unit 110 (FIG. 1) may perform a TX sector scan to detect the plurality of directional links, e.g., as described above.

As indicated at block 512, measuring the beamforming parameters may include performing an RX sector scan. For example, wireless communication unit 120 (FIG. 1) may perform an RX sector scan to detect the plurality of the directional links, e.g., as described above.

As indicated at block 513, measuring the beamforming parameters may include performing TX-RX beam combining. For example, wireless communication unit 110 (FIG. 1) may perform TX-RX beam combining, e.g., as described above.

In some demonstrative embodiments, the TX-RX combining may provide a plurality of pairs of the TX-RX sectors, with measured channel impulse response for each pair.

As indicated at block 520, the method may include determining a MIMO beamformed scheme. For example, controller 122 (FIG. 1) may determine the MIMO beamformed scheme for communicating between devices 102 and 104 (FIG. 1), e.g., as described above.

As indicated at block 521, determining the MIMO beamformed scheme may include calculating a selection metric for each pair of TX-RX sectors. For example, controller 122

(FIG. 1) may calculate the selection metric, e.g., the selection metric C, for each pair of the N directional links 205 (FIG. 2), e.g., as described above.

As indicated at block 522, determining the MIMO beamformed scheme may include selecting a pair of directional links. For example, controller 122 (FIG. 1) may select directional beams 211 and 215 (FIG. 2) based on the selection metric, e.g., as described above.

As indicated at block 523, determining the MIMO beamformed scheme may include calculating an optimal MIMO mode and parameters for the selected directional links. For example, controller 122 (FIG. 1) may calculate the weighting coefficients to be applied at baseband and/or RF processing, e.g., as described above.

As indicated at block 530, the method may include configuring the MIMO beamformed scheme. For example, controller 122 (FIG. 1) may configure the MIMO beamformed scheme of wireless communication unit 110 (FIG. 1), e.g., as described above.

As indicated at block 531, configuring the MIMO beamformed scheme may include selecting a MIMO mode. For example, controller 122 (FIG. 1) may select the MIMO processing mode at baseband 150, e.g., OL, CL, SBC and the like, e.g., as described above.

As indicated at block 532, configuring the MIMO beamformed scheme may include determining phases for the phase shifters for RF processing. For example, controller 122 (FIG. 1) may determine phases to be applied by phase shifters 115 and/or 114 (FIG. 1), e.g., as described above.

As indicated at block 533, configuring the MIMO beamformed scheme may include determining baseband weighting coefficients for baseband MIMO processing. For example, controller 122 (FIG. 1) may determine weighting coefficients for MIMO processing at baseband 150 (FIG. 1), e.g., as described above.

Figure 6:
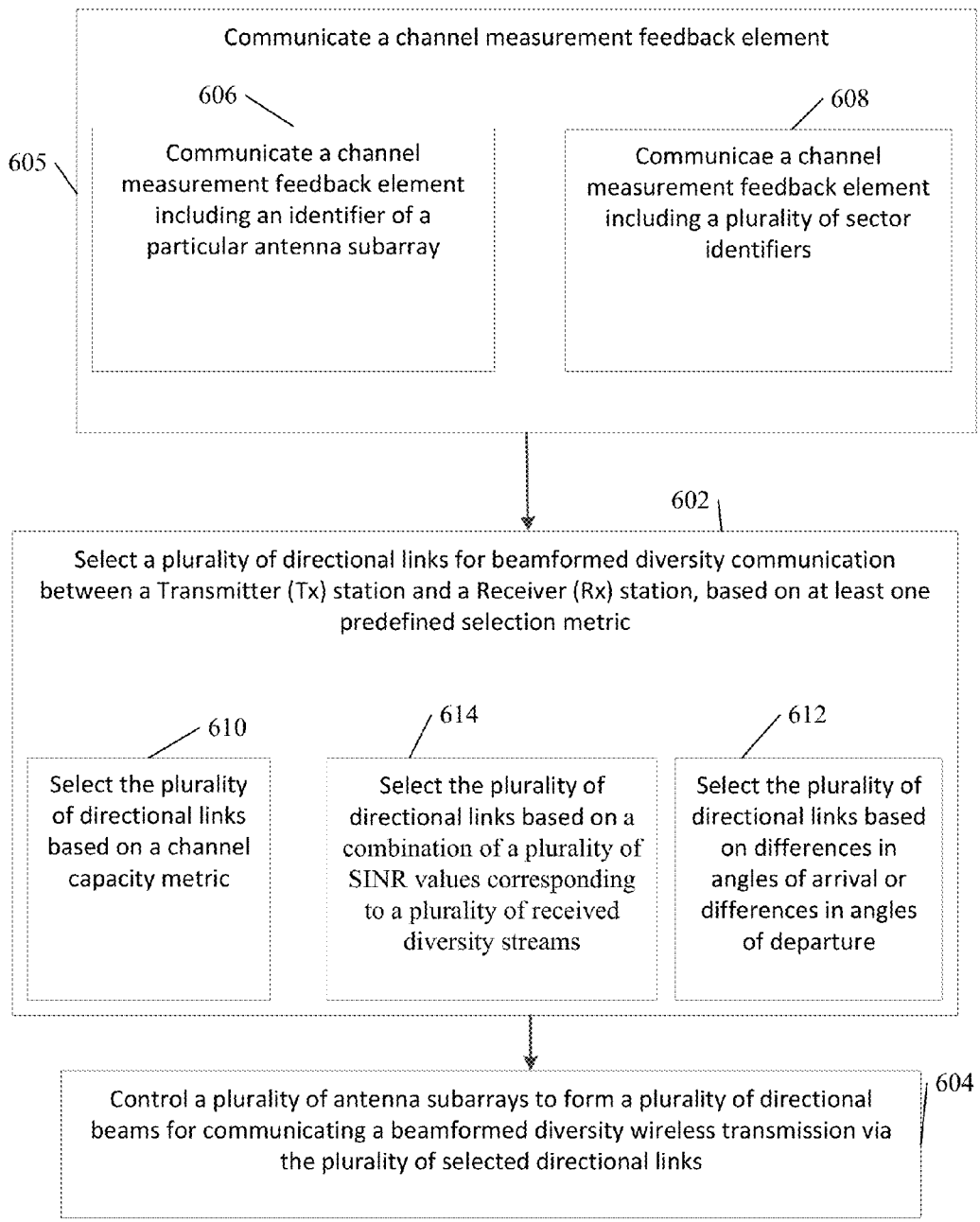
FIG. 6 is a schematic flow-chart illustration of a method of beamformed diversity wireless communication, in accordance with some demonstrative embodiments.

Reference is made to FIG. 6, which schematically illustrates a method of beamformed diversity wireless communication, in accordance with some demonstrative embodiments. In some embodiments, one or more of the operations of the method of FIG. 6 may be performed by a wireless communication system, e.g., system 100 (FIG. 1); a wireless communication device, e.g., devices 102 and/or 104 (FIG. 1); a baseband, e.g., baseband 150 (FIG. 1); a controller, e.g., controller 122 (FIG. 1), and/or a wireless communication unit, e.g., wireless communication units 110 and/or 120 (FIG. 1).

As indicated at block 602, the method may include selecting a plurality of directional links for beamformed diversity communication between a Transmitter (Tx) station and a Receiver (Rx) station, based on at least one predefined selection metric. For example, controller 122 (FIG. 1) may select the plurality of directional links for MIMO communication between devices 102 (FIG. 1) and 104 (FIG. 1), based on the selection metric C, e.g., as described above.

As indicated at block 604, the method may include controlling a plurality of antenna subarrays to form a plurality of directional beams for communicating a beamformed diversity wireless transmission via the plurality of selected directional links. For example, controller 122 (FIG. 1) may controller 122 (FIG. 1) may control antenna subarrays 135 and 145 (FIG. 1) to form directional beams 137 and 147 (FIG. 1) for communicating the MIMO wireless transmission via the plurality of selected directional links, e.g., as described above.

In some demonstrative embodiments, the directional links may be selected based on channel measurement feedback communicated between the TX and Rx sides.

As indicated at block 605, the method may include communicating a channel measurement feedback element. For example, wireless communication unit 110 (FIG. 1) may communicate the channel measurement feedback element to device 104 (FIG. 1), e.g., as described above.

As indicated at block 606, the method may include communicating the channel measurement feedback element including an identifier of a particular antenna subarray and one or more measurements corresponding to the particular antenna subarray. For example, wireless communication unit 110 (FIG. 1) may communicate beam refinement element 300 (FIG. 3) including field 302 (FIG. 3) representing an antenna subarray of antenna subarrays 135 and 145 (FIG. 1), and one or more measurements corresponding to the antenna subarray indentified by field 302 (FIG. 3), e.g., as described above.

As indicated at block 608, the method may include communicating the channel measurement feedback element including a plurality of sector identifiers, each sector identifier identifying an antenna subarray and a sector corresponding to the antenna subarray, and a plurality of measurements corresponding to the plurality of sector identifiers. For example, wireless communication unit 110 (FIG. 1) may communicate channel measurement feedback element 400 (FIG. 4) including plurality of sector identifiers, e.g., in subfield 408, and a plurality of measurements, for example, in subfields 402, 404 and 408 (FIG. 4), corresponding to the plurality of sector identifiers, e.g., as described above.

As indicated at block 610, the method may include selecting the plurality of directional links for the beamformed diversity communication based on a channel capacity metric. For example, controller 122 (FIG. 1) may select the plurality of directional links for MIMO communication between devices 102 (FIG. 1) and 104 (FIG. 1), based on the channel capacity metric, e.g., as described above.

As indicated at block 612, the method may include selecting the plurality of directional links for the beamformed diversity communication based on differences in angles of arrival and/or differences in angles of departure. For example, controller 122 (FIG. 1) may select the plurality of directional links for MIMO communication between devices 102 (FIG. 1) and 104 (FIG. 1), based on differences in angles of arrival or differences in angles of departure of the N directional links 205 (FIG. 2), e.g., as described above.

As indicated at block 612, the method may include selecting the plurality of directional links for the beamformed diversity communication based on a combination of a plurality of SINR values corresponding to a plurality of received diversity streams. For example, controller 122 (FIG. 1) may select the plurality of directional links for MIMO communication between devices 102 (FIG. 1) and 104 (FIG. 1), based on a combination of a plurality of SINR values of a particular directional link of the N directional links 205 (FIG. 2) corresponding to a plurality of received MIMO streams of the particular directional link, e.g., as described above.

Figure 7:
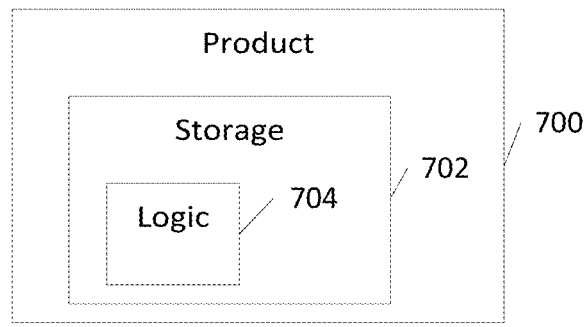
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of device 102 (FIG. 1), device 104 (FIG. 1), wireless communication unit 110 (FIG. 1), wireless communication unit 120 (FIG. 1), and/or controller 122 (FIG. 1) and/or to perform one or more operations of the methods of FIG. 5 and FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 is an apparatus comprising a controller to control a plurality of antenna subarrays to form a plurality of directional beams for communicating a beamformed diversity wireless transmission over a plurality of selected directional links, which are selected based on at least one predefined selection metric.

Example 2 includes the subject matter of Example 1 and optionally, wherein the selection metric comprises a channel capacity metric.

Example 3 includes the subject matter of Example 1 or 2 and optionally, wherein the selection metric is based on differences in angles of arrival, differences in angles of departure, or a combination thereof.

Example 4 includes the subject matter of any one of Examples 1-3 and optionally, wherein the controller is to determine the selection metric with respect to a directional link based on a channel matrix corresponding to the link and a number of transmit antenna subarrays.

Example 5 includes the subject matter of any one of Examples 1-4 and optionally, wherein the controller is to determine the selection metric with respect to a directional link based on a combination of a plurality of Signal-to-Interference-plus-noise-ratio (SINR) values corresponding to a plurality of received streams of the directional link.

Example 6 includes the subject matter of Example 5 and optionally, wherein the controller is to determine an SINR value of the SINR values based on an effective channel after performing Space-Block-Code processing.

Example 7 includes the subject matter of any one of Examples 1-6 and optionally, wherein the controller is to communicate a channel measurement feedback element including an identifier of an antenna subarray, and one or more measurements corresponding to the antenna subarray.

Example 8 includes the subject matter of Example 7 and optionally, wherein the channel measurement feedback element comprises a beam refinement element, and wherein the identifier is included in a field of the beam refinement element.

Example 9 includes the subject matter of Example 8 and optionally, wherein the identifier comprises a three-bit identifier.

Example 10 includes the subject matter of Example 7 and optionally, wherein the controller is to communicate the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 11 includes the subject matter of Example 10 and optionally, wherein the identifier comprises a sector number representing the sector corresponding to the antenna subarray.

Example 12 includes the subject matter of Example 11 and optionally, wherein the sector number comprises an 8-bit number.

Example 13 includes the subject matter of any one of Examples 1-12 and optionally, wherein each of the directional links is formed by a pair of a transmit (Tx) sector and a Receive (Rx) sector.

Example 14 includes the subject matter of any one of Examples 1-13 and optionally, wherein the plurality of directional links comprise a plurality of beamformed links between the antenna subarrays and one or more antenna subarrays of a wireless communication device.

Example 15 includes the subject matter of any one of Examples 1-14 and optionally, wherein the beamformed diversity wireless transmission comprises a multi-input-multi-output (MIMO) wireless transmission over the plurality of selected directional links.

Example 16 includes the subject matter of any one of Examples 1-15 and optionally, wherein the wireless transmission comprises a transmission over a millimeter wave (mmWave) channel, or a directional multi-gigabit (DMG) channel.

Example 17 includes apparatus of wireless communication, the apparatus comprising a controller to control a plurality of antenna subarrays to form a plurality of directional beams for communicating a wireless beamformed transmission, the controller is to communicate a channel measurement feedback element including an identifier of an antenna subarray of the antenna subarrays, and one or more measurements corresponding to the antenna subarray.

Example 18 includes the subject matter of Example 17 and optionally, wherein the channel measurement feedback element comprises a beam refinement element, and wherein the identifier is included in a field of the beam refinement element.

Example 19 includes the subject matter of Example 18 and optionally, wherein the identifier comprises a three-bit identifier.

Example 20 includes the subject matter of Example 17 and optionally, wherein the controller is to communicate the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 21 includes the subject matter of Example 20 and optionally, wherein the identifier comprises a sector number representing the sector corresponding to the antenna subarray.

Example 22 includes the subject matter of Example 21 and optionally, wherein the sector number comprises an 8-bit number.

Example 23 includes the subject matter of any one of Examples 17-22 and optionally, wherein the controller is to control the plurality of antenna subarrays to form the plurality of directional beams for communicating a beamformed diversity wireless transmission over the plurality of directional beams.

Example 24 includes the subject matter of Example 23 and optionally, wherein the plurality of directional links comprise a plurality of beamformed links between the antenna subarrays and one or more antenna subarrays of a wireless communication device.

Example 25 includes the subject matter of Example 23 or 24 and optionally, wherein the beamformed diversity wireless transmission comprises a multi-input-multi-output (MIMO) wireless transmission over the plurality of directional links.

Example 26 includes the subject matter of any one of Examples 17-25 and optionally, wherein the wireless beamformed transmission comprises a transmission over a millimeter wave (mmWave) channel, or a directional multi-gigabit (DMG) channel.

Example 27 includes a system of wireless communication, the system comprising at least one wireless communication device to communicate a beamformed diversity wireless transmission, the wireless communication device comprising one or more antenna arrays controllable as a plurality of antenna subarrays; a plurality of Radio Frequency (RF) chains coupled to the plurality of antenna subarrays; and a controller to control the plurality of antenna subarrays to form a plurality of directional beams for communicating the beamformed diversity wireless transmission over a plurality of selected directional links, which are selected based on at least one predefined selection metric.

Example 28 includes the subject matter of Example 27 and optionally, wherein the selection metric comprises a channel capacity metric.

Example 29 includes the subject matter of Example 27 or 28 and optionally, wherein the selection metric is based on differences in angles of arrival, differences in angles of departure, or a combination thereof.

The system of any one of claims 27-29, wherein the controller is to determine the selection metric with respect to a directional link based on a channel matrix corresponding to the link and a number of transmit antenna subarrays.

Example 30 includes the subject matter of any one of Examples 27-30 and optionally, wherein the controller is to determine the selection metric with respect to a directional link based on a combination of a plurality of Signal-to-Interference-plus-noise-ratio (SINR) values corresponding to a plurality of received streams of the directional link.

Example 32 includes the subject matter of Example 31 and optionally, wherein the controller is to determine an SINR value of the SINR values based on an effective channel after performing Space-Block-Code processing.

Example 33 includes the subject matter of any one of Examples 27-32 and optionally, wherein the wireless communication device is to communicate a channel measurement feedback element including an identifier of an antenna subarray, and one or more measurements corresponding to the antenna subarray.

Example 34 includes the subject matter of Example 33 and optionally, wherein the channel measurement feedback element comprises a beam refinement element, and wherein the identifier is included in a field of the beam refinement element.

Example 35 includes the subject matter of Example 34 and optionally, wherein the identifier comprises a three-bit identifier.

Example 36 includes the subject matter of Example 33 and optionally, wherein the wireless communication device is to communicate the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 37 includes the subject matter of Example 36 and optionally, wherein the identifier comprises a sector number representing the sector corresponding to the antenna subarray.

Example 38 includes the subject matter of Example 37 and optionally, wherein the sector number comprises an 8-bit number.

Example 39 includes the subject matter of any one of Examples 27-38 and optionally, wherein each of the directional links is formed by a pair of a transmit (Tx) sector and a Receive (Rx) sector.

Example 40 includes the subject matter of any one of Examples 27-39 and optionally, wherein the plurality of directional links comprise a plurality of beamformed links between the antenna subarrays and one or more antenna subarrays of another wireless communication device.

Example 41 includes the subject matter of any one of Examples 27-40 and optionally, wherein the beamformed diversity wireless transmission comprises a multi-input-multi-output (MIMO) wireless transmission over the plurality of selected directional links.

Example 42 includes the subject matter of any one of Examples 27-41 and optionally, wherein the wireless transmission comprises a transmission over a millimeter wave (mmWave) channel, or a directional multi-gigabit (DMG) channel.

Example 43 includes a system of wireless communication, the system comprising at least one wireless communication device comprising: one or more antenna arrays controllable as a plurality of antenna subarrays; a plurality of Radio Frequency (RF) chains coupled to the plurality of antenna subarrays; and a controller to control the plurality of antenna subarrays to form a plurality of directional beams for communicating a wireless beamformed transmission, the wireless communication device is to communicate a channel measurement feedback element including an identifier of an antenna subarray of the antenna subarrays, and one or more measurements corresponding to the antenna subarray.

Example 44 includes the subject matter of Example 43 and optionally, wherein the channel measurement feedback element comprises a beam refinement element, and wherein the identifier is included in a field of the beam refinement element.

Example 45 includes the subject matter of Example 44 and optionally, wherein the identifier comprises a three-bit identifier.

Example 46 includes the subject matter of Example 43 and optionally, wherein the wireless communication device is to communicate the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 47 includes the subject matter of Example 46 and optionally, wherein the identifier comprises a sector number representing the sector corresponding to the antenna subarray.

Example 48 includes the subject matter of Example 47 and optionally, wherein the sector number comprises an 8-bit number.

Example 49 includes the subject matter of any one of Examples 43-48 and optionally, wherein the controller is to control the plurality of antenna subarrays to form the plurality of directional beams for communicating a beamformed diversity wireless transmission over the plurality of directional beams.

Example 50 includes the subject matter of Example 49 and optionally, wherein the plurality of directional links comprise a plurality of beamformed links between the antenna subarrays and one or more antenna subarrays of another wireless communication device.

Example 51 includes the subject matter of Example 49 or 50 and optionally, wherein the beamformed diversity wireless transmission comprises a multi-input-multi-output (MIMO) wireless transmission over the plurality of directional links.

Example 52 includes the subject matter of any one of Examples 43-51 and optionally, wherein the wireless beamformed transmission comprises a transmission over a millimeter wave (mmWave) channel, or a directional multi-gigabit (DMG) channel.

Example 53 includes a method of wireless communication, the method comprising: selecting a plurality of directional links for beamformed diversity wireless communication between a Transmitter (Tx) station and a Receiver (Rx) station, based on at least one predefined selection metric; and controlling a plurality of antenna subarrays to form a plurality of directional beams for communicating a beamformed diversity wireless transmission via the plurality of selected directional links.

Example 54 includes the subject matter of Example 53 and optionally, wherein the selection metric comprises a channel capacity metric.

Example 55 includes the subject matter of Example 53 or 54 and optionally, wherein the selection metric is based on differences in angles of arrival, differences in angles of departure, or a combination thereof.

Example 56 includes the subject matter of any one of Examples 53-55 and optionally, comprising determining the selection metric with respect to a directional link based on a channel matrix corresponding to the link and a number of transmit antenna subarrays.

Example 57 includes the subject matter of any one of Examples 53-56 and optionally, comprising determining the selection metric with respect to a directional link based on a combination of a plurality of Signal-to-Interference-plus-noise-ratio (SINR) values corresponding to a plurality of received streams of the directional link.

Example 58 includes the subject matter of Example 57 and optionally, comprising determining an SINR value of the SINR values based on an effective channel after performing Space-Block-Code processing.

Example 59 includes the subject matter of any one of Examples 53-58 and optionally, comprising communicating a channel measurement feedback element including an identifier of an antenna subarray, and one or more measurements corresponding to the antenna subarray.

Example 60 includes the subject matter of Example 59 and optionally, wherein the channel measurement feedback element comprises a beam refinement element, and wherein the identifier is included in a field of the beam refinement element.

Example 61 includes the subject matter of Example 60 and optionally, wherein the identifier comprises a three-bit identifier.

Example 62 includes the subject matter of Example 59 and optionally, comprising communicating the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 63 includes the subject matter of Example 62 and optionally, wherein the identifier comprises a sector number representing the sector corresponding to the antenna subarray.

Example 64 includes the subject matter of Example 63 and optionally, wherein the sector number comprises an 8-bit number.

Example 65 includes the subject matter of any one of Examples 53-64 and optionally, wherein each of the directional links is formed by a pair of a transmit (Tx) sector and a Receive (Rx) sector.

Example 66 includes the subject matter of any one of Examples 53-65 and optionally, wherein the plurality of directional links comprise a plurality of beamformed links between the antenna subarrays and one or more antenna subarrays of a wireless communication device.

Example 67 includes the subject matter of any one of Examples 53-66 and optionally, wherein the beamformed diversity wireless transmission comprises a multi-input-multi-output (MIMO) wireless transmission over the plurality of selected directional links.

Example 68 includes the subject matter of any one of Examples 53-67 and optionally, wherein the wireless transmission comprises a transmission over a millimeter wave (mmWave) channel, or a directional multi-gigabit (DMG) channel.

Example 69 includes a method of wireless communication, the method comprising: controlling a plurality of antenna subarrays to form a plurality of directional beams for communicating a wireless beamformed transmission; and communicating a channel measurement feedback element including an identifier of an antenna subarray of the antenna subarrays, and one or more measurements corresponding to the antenna subarray.

Example 70 includes the subject matter of Example 69 and optionally, wherein the channel measurement feedback element comprises a beam refinement element, and wherein the identifier is included in a field of the beam refinement element.

Example 71 includes the subject matter of Example 70 and optionally, wherein the identifier comprises a three-bit identifier.

Example 72 includes the subject matter of Example 69 and optionally, comprising communicating the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 73 includes the subject matter of Example 62 and optionally, wherein the identifier comprises a sector number representing the sector corresponding to the antenna subarray.

Example 74 includes the subject matter of Example 73 and optionally, wherein the sector number comprises an 8-bit number.

Example 75 includes the subject matter of any one of Examples 69-74 and optionally, comprising controlling the plurality of antenna subarrays to form the plurality of directional beams for communicating a beamformed diversity wireless transmission over the plurality of directional beams.

Example 76 includes the subject matter of Example 75 and optionally, wherein the plurality of directional links comprise a plurality of beamformed links between the antenna subarrays and one or more antenna subarrays of a wireless communication device.

Example 77 includes the subject matter of Example 75 or 76 and optionally, wherein the beamformed diversity wireless transmission comprises a multi-input-multi-output (MIMO) wireless transmission over the plurality of directional links.

Example 78 includes the subject matter of any one of Examples 69-77 and optionally, wherein the wireless beamformed transmission comprises a transmission over a millimeter wave (mmWave) channel, or a directional multi-gigabit (DMG) channel.

Example 79 includes a product including a non-transitory storage medium having stored thereon instructions that, when executed by a machine, result in selecting a plurality of directional links for beamformed diversity wireless communication between a Transmitter (Tx) station and a Receiver (Rx) station, based on at least one predefined selection metric; and controlling a plurality of antenna subarrays to form a plurality of directional beams for communicating a beamformed diversity wireless transmission via the plurality of selected directional links.

Example 80 includes the subject matter of Example 79 and optionally, wherein the selection metric comprises a channel capacity metric.

Example 81 includes the subject matter of Example 79 or 80 and optionally, wherein the selection metric is based on differences in angles of arrival, differences in angles of departure, or a combination thereof.

Example 82 includes the subject matter of any one of Examples 79-81 and optionally, wherein the instructions result in determining the selection metric with respect to a directional link based on a channel matrix corresponding to the link and a number of transmit antenna subarrays.

Example 83 includes the subject matter of any one of Examples 79-82 and optionally, wherein the instructions result in determining the selection metric with respect to a directional link based on a combination of a plurality of Signal-to-Interference-plus-noise-ratio (SINR) values corresponding to a plurality of received streams of the directional link.

Example 84 includes the subject matter of Example 83 and optionally, wherein the instructions result in determining an SINR value of the SINR values based on an effective channel after performing Space-Block-Code processing.

Example 85 includes the subject matter of any one of Examples 79-84 and optionally, wherein the instructions result in communicating a channel measurement feedback element including an identifier of an antenna subarray, and one or more measurements corresponding to the antenna subarray.

Example 86 includes the subject matter of Example 85 and optionally, wherein the channel measurement feedback element comprises a beam refinement element, and wherein the identifier is included in a field of the beam refinement element.

Example 87 includes the subject matter of Example 86 and optionally, wherein the identifier comprises a three-bit identifier.

Example 88 includes the subject matter of Example 85 and optionally, wherein the instructions result in communicating the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 89 includes the subject matter of Example 88 and optionally, wherein the identifier comprises a sector number representing the sector corresponding to the antenna subarray.

Example 90 includes the subject matter of Example 89 and optionally, wherein the sector number comprises an 8-bit number.

Example 91 includes the subject matter of any one of Examples 79-90 and optionally, wherein each of the directional links is formed by a pair of a transmit (Tx) sector and a Receive (Rx) sector.

Example 92 includes the subject matter of any one of Examples 79-91 and optionally, wherein the plurality of directional links comprise a plurality of beamformed links between the antenna subarrays and one or more antenna subarrays of a wireless communication device.

Example 93 includes the subject matter of any one of Examples 79-92 and optionally, wherein the beamformed diversity wireless transmission comprises a multi-input-multi-output (MIMO) wireless transmission over the plurality of selected directional links.

Example 94 includes the subject matter of any one of Examples 79-93 and optionally, wherein the wireless transmission comprises a transmission over a millimeter wave (mmWave) channel, or a directional multi-gigabit (DMG) channel.

Example 95 includes a product including a non-transitory storage medium having stored thereon instructions that, when executed by a machine, result in controlling a plurality of antenna subarrays to form a plurality of directional beams for communicating a wireless beamformed transmission; and communicating a channel measurement feedback element including an identifier of an antenna subarray of the antenna subarrays, and one or more measurements corresponding to the antenna subarray.

Example 96 includes the subject matter of Example 95 and optionally, wherein the channel measurement feedback element comprises a beam refinement element, and wherein the identifier is included in a field of the beam refinement element.

Example 97 includes the subject matter of Example 96 and optionally, wherein the identifier comprises a three-bit identifier.

Example 98 includes the subject matter of Example 95 and optionally, wherein the instructions result in communicating the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 99 includes the subject matter of Example 98 and optionally, wherein the identifier comprises a sector number representing the sector corresponding to the antenna subarray.

Example 100 includes the subject matter of Example 99 and optionally, wherein the sector number comprises an 8-bit number.

Example 101 includes the subject matter of any one of Examples 95-100 and optionally, wherein the instructions result in controlling the plurality of antenna subarrays to form the plurality of directional beams for communicating a beamformed diversity wireless transmission over the plurality of directional beams.

Example 102 includes the subject matter of Example 101 and optionally, wherein the plurality of directional links comprise a plurality of beamformed links between the antenna subarrays and one or more antenna subarrays of a wireless communication device.

Example 103 includes the subject matter of Example 101 or 102 and optionally, wherein the beamformed diversity wireless transmission comprises a multi-input-multi-output (MIMO) wireless transmission over the plurality of directional links.

Example 104 includes the subject matter of any one of Example 95-103 and optionally, wherein the wireless beamformed transmission comprises a transmission over a millimeter wave (mmWave) channel, or a directional multi-gigabit (DMG) channel.

Example 105 includes an apparatus of wireless communication, the apparatus comprising means for selecting a plurality of directional links for beamformed diversity wireless communication between a Transmitter (Tx) station and a Receiver (Rx) station, based on at least one predefined selection metric; and means for controlling a plurality of antenna subarrays to form a plurality of directional beams for communicating a beamformed diversity wireless transmission via the plurality of selected directional links.

Example 106 includes the subject matter of Example 105 and optionally, wherein the selection metric comprises a channel capacity metric.

Example 107 includes the subject matter of Example 105 or 106 and optionally, wherein the selection metric is based on differences in angles of arrival, differences in angles of departure, or a combination thereof.

Example 108 includes the subject matter of any one of Examples 105-107 and optionally, comprising means for determining the selection metric with respect to a directional link based on a channel matrix corresponding to the link and a number of transmit antenna subarrays.

Example 109 includes the subject matter of any one of Examples 105-108 and optionally, comprising means for determining the selection metric with respect to a directional link based on a combination of a plurality of Signal-to-Interference-plus-noise-ratio (SINR) values corresponding to a plurality of received streams of the directional link.

Example 110 includes the subject matter of Example 109 and optionally, comprising means for determining an SINR value of the SINR values based on an effective channel after performing Space-Block-Code processing.

Example 111 includes the subject matter of any one of Examples 105-110 and optionally, comprising means for communicating a channel measurement feedback element including an identifier of an antenna subarray, and one or more measurements corresponding to the antenna subarray.

Example 112 includes the subject matter of Example 111 and optionally, wherein the channel measurement feedback element comprises a beam refinement element, and wherein the identifier is included in a field of the beam refinement element.

Example 113 includes the subject matter of Example 112 and optionally, wherein the identifier comprises a three-bit identifier.

Example 114 includes the subject matter of Example 111 and optionally, comprising means for communicating the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 115 includes the subject matter of Example 114 and optionally, wherein the identifier comprises a sector number representing the sector corresponding to the antenna subarray.

Example 116 includes the subject matter of Example 115 and optionally, wherein the sector number comprises an 8-bit number.

Example 117 includes the subject matter of any one of Examples 105-116 and optionally, wherein each of the directional links is formed by a pair of a transmit (Tx) sector and a Receive (Rx) sector.

Example 118 includes the subject matter of any one of Examples 105-117 and optionally, wherein the plurality of directional links comprise a plurality of beamformed links between the antenna subarrays and one or more antenna subarrays of a wireless communication device.

Example 119 includes the subject matter of any one of Examples 105-118 and optionally, wherein the beamformed diversity wireless transmission comprises a multi-input-multi-output (MIMO) wireless transmission over the plurality of selected directional links.

Example 120 includes the subject matter of any one of Examples 105-119 and optionally, wherein the wireless transmission comprises a transmission over a millimeter wave (mmWave) channel, or a directional multi-gigabit (DMG) channel.

Example 121 includes an apparatus of wireless communication, the apparatus comprising means for controlling a plurality of antenna subarrays to form a plurality of directional beams for communicating a wireless beamformed transmission; and means for communicating a channel measurement feedback element including an identifier of an antenna subarray of the antenna subarrays, and one or more measurements corresponding to the antenna subarray.

Example 122 includes the subject matter of Example 121 and optionally, wherein the channel measurement feedback element comprises a beam refinement element, and wherein the identifier is included in a field of the beam refinement element.

Example 123 includes the subject matter of Example 122 and optionally, wherein the identifier comprises a three-bit identifier.

Example 124 includes the subject matter of Example 121 and optionally, comprising means for communicating the channel measurement feedback element including a plurality of sector identifiers, each sector identifier identifying an antenna subarray and a sector corresponding to the antenna subarray, the channel measurement feedback element including a plurality of measurements corresponding to the plurality of sector identifiers.

Example 125 includes the subject matter of Example 124 and optionally, wherein the identifier comprises a sector number representing the sector corresponding to the antenna subarray.

Example 126 includes the subject matter of Example 125 and optionally, wherein the sector number comprises an 8-bit number.

Example 127 includes the subject matter of any one of Examples 121-126 and optionally, comprising means for controlling the plurality of antenna subarrays to form the plurality of directional beams for communicating a beamformed diversity wireless transmission over the plurality of directional beams.

Example 128 includes the subject matter of Example 127 and optionally, wherein the plurality of directional links comprise a plurality of beamformed links between the antenna subarrays and one or more antenna subarrays of a wireless communication device.

Example 129 includes the subject matter of Example 127 or 128 and optionally, wherein the beamformed diversity wireless transmission comprises a multi-input-multi-output (MIMO) wireless transmission over the plurality of directional links.

Example 130 includes the subject matter of any one of Examples 121-129 and optionally, wherein the wireless beamformed transmission comprises a transmission over a millimeter wave (mmWave) channel, or a directional multi-gigabit (DMG) channel.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A computer program product embodied in a non-transitory computer readable medium comprising computer instructions for:
   performing beamforming processing, in a baseband processor of a first wireless communication device, for a plurality of beams of a Multi-Input-Multi-Output (MIMO) beamformed transmission between the first wireless communication device and a second wireless communication device, the plurality of beams to be formed by a plurality of antenna subarrays coupled to at least one Radio Frequency (RF) chain of the first wireless communication device;
   performing the beamforming processing based on at least a power metric of a received signal corresponding to the plurality of beams;
   selecting the plurality of beams based on measurements corresponding to one or more transmissions received from the second wireless communication device; and
   feeding back to the second wireless communication device a message comprising a plurality of sector identifiers, a sector identifier of the plurality of sector identifiers to identify an antenna subarray and a sector corresponding to the antenna subarray, and beam selection information corresponding to one or more of the plurality of beams.

2. The computer program product of claim 1, further comprising computer instructions for selecting the plurality of beams based on an angle of arrival metric corresponding to the plurality of beams.

3. The computer program product of claim 1, further comprising computer instructions for performing a hybrid beamforming, which includes RF beamforming by the at least one RF chain.

4. The computer program product of claim 1, further comprising computer instructions for beamforming processing based on the measurements corresponding to the one or more transmissions received from the second wireless communication device.

5. The computer program product of claim 1, further comprising computer instructions for Transmit (Tx) beamforming processing the MIMO beamformed transmission.

6. A device comprising:
   a plurality of antenna subarrays configured to form a plurality of beams of a Multi-Input-Multi-Output (MIMO) beamformed transmission between a first wireless communication device and a second wireless communication device;
   at least one Radio Frequency (RF) chain coupled to the plurality of antenna subarrays; and
   a baseband processor configured to perform beamforming processing for the plurality of beams based on at least a power metric of a received signal corresponding to the plurality of beams, said baseband processor configured to select the plurality of beams based on measurements corresponding to one or more transmissions received from the second wireless communication device, and to cause the first wireless communication device to feed back to the second wireless communication device a message comprising a plurality of sector identifiers, a sector identifier of the plurality of sector identifiers to identify an antenna subarray and a sector corresponding to the antenna subarray, and beam selection information corresponding to one or more of the plurality of beams.

7. The device of claim 6, wherein the at least one RF chain comprises a plurality of phase shifters to adjust phases of a plurality of antenna elements of an antenna subarray of said plurality of antenna subarrays.

8. The device of claim 6, wherein the plurality of antenna subarrays comprises a plurality of antenna elements in a predefined geometry to direct the plurality of beams to a plurality of different directions.

9. The device of claim 6, wherein the MIMO beamformed transmission is over a millimeterWave (mmwave) channel.

10. The device of claim 6, wherein the device is a mobile device.

11. The device of claim 6, wherein the device is a wireless network station.

12. The device of claim 6, wherein the device is configured to communicate the MIMO beamformed transmission in a Fifth Generation (5G) mobile network.

13. The device of claim 6, wherein the device further comprises a memory, a processor, and a storage.

14. The device of claim 6, wherein the at least one RF chain comprises a plurality of RF chains.

15. The device of claim 6, wherein the baseband processor is configured to perform beamforming processing by selecting the plurality of beams based on an angle of arrival metric corresponding to the plurality of beams.

16. The device of claim 6, wherein the baseband processor is configured to perform baseband beamforming of a hybrid beamforming, which includes RF beamforming by the at least one RF chain.

17. The device of claim 6, wherein the baseband processor is configured to perform Transmit (Tx) beamforming processing of the MIMO beamformed transmission.

18. The computer program product of claim 1, wherein the MIMO beamformed transmission is over a millimeterWave (mmwave) channel.

* * * * *